UNITED STATES PATENT OFFICE.

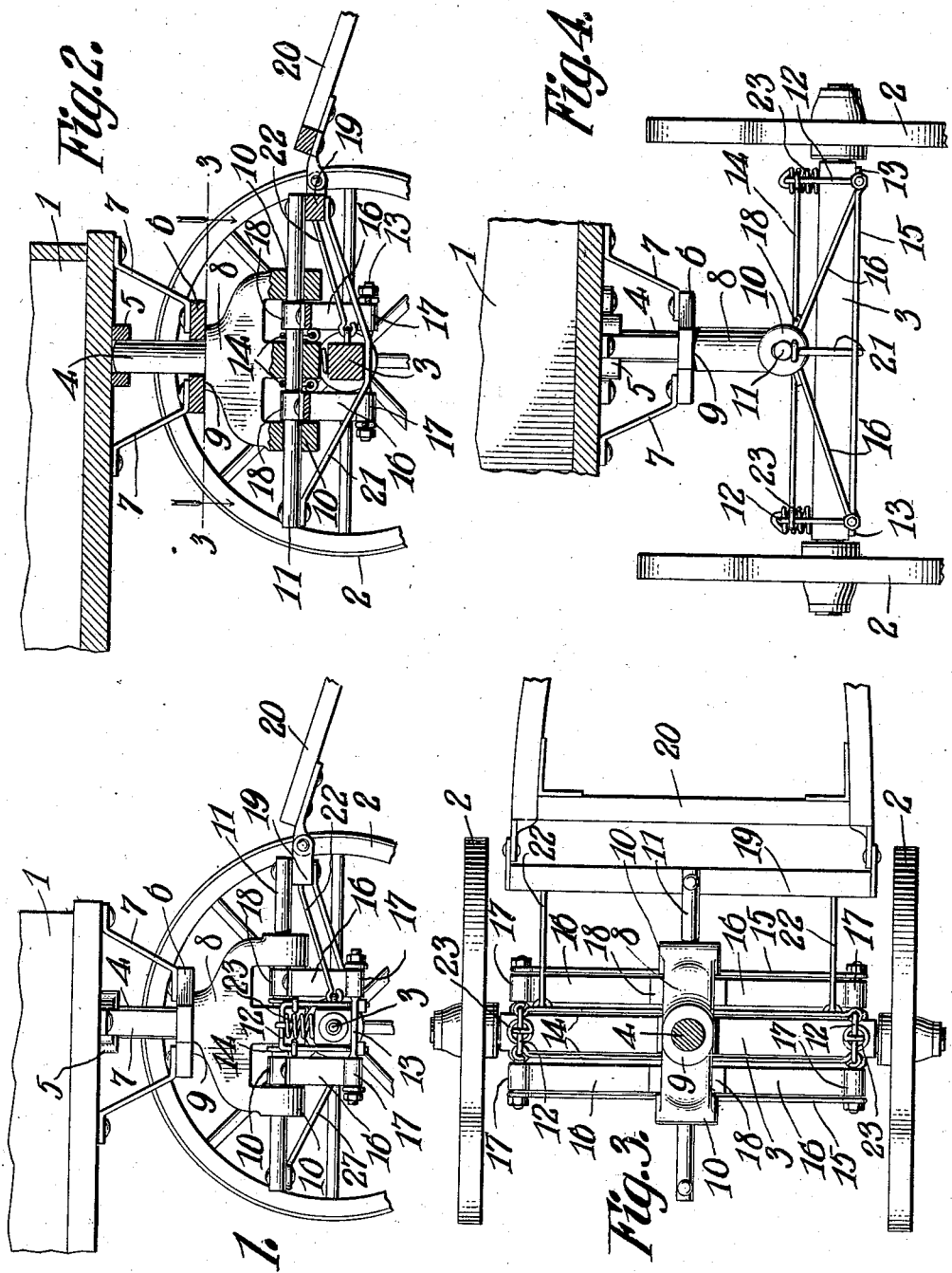

WARREN G. HUGHES, OF CAIRO, ILLINOIS.

FORE-CARRIAGE FOR VEHICLES.

No. 860,094.　　　Specification of Letters Patent.　　　Patented July 16, 1907.

Application filed August 2, 1906. Serial No. 328,912.

*To all whom it may concern:*

Be it known that I, WARREN G. HUGHES, a citizen of the United States, residing at Cairo, in the county of Alexander and State of Illinois, have invented a new and useful Fore-Carriage for Vehicles, of which the following is a specification.

This invention relates to vehicles, and it relates more particularly to a fore-carriage and fifth wheel construction which has for one of its objects to provide a maximum degree of flexibility and durability, so that the vehicle can travel over rough surfaces without subjecting the vehicle as a whole to destructive strains and without discomforting the driver and other occupants.

Another object of the invention is to provide a fifth wheel by means of which the front axle oscillates in a horizontal plane and a hinged connection between the axle and king bolt for permitting the axle to oscillate in a vertical plane.

Another object of the invention is to improve and simplify the construction generally and the operation of apparatus of this character.

With these objects in view, and others, as will appear as the nature of the invention is better understood, the invention comprises the various novel features of construction, which will be more fully described hereinafter and set forth with particularity in the claims appended hereto.

In the accompanying drawing, which illustrates one of the embodiments of the invention, Figure 1 is a side elevation of the front portion of a wagon, the near wheel being removed and the wagon body and the other wheel being shown only in part. Fig. 2 is a central longitudinal section. Fig. 3 is a plan view of the fore-carriage. Fig. 4 is a transverse section of the wagon taken at the rear of the fore-carriage.

Corresponding parts in the several figures are indicated throughout by similar characters of reference.

In the present instance, I have elected to illustrate the invention in connection with what purports to be a horse-drawn farm wagon, but I desire to have it understood that the invention is not necessarily limited to this class of vehicles, since certain of its features are adaptable to other uses.

Referring to the drawing, 1 designates the front portion of the body of a vehicle, 2 the front road-wheels, and 3 the axle, all of which may be of any approved construction.

4 designates the king-bolt arranged with its upper end projecting into a circular socket 5 suitably secured to the under side of the bottom of the body 1. The king bolt is held at right angles to the body by means of the ring 6 supported on the body 1 and braced therefrom by the members 7, the king-bolt being confined within the opening of the ring 6. The head 8 of the kingbolt is enlarged downwardly and in a plane extending longitudinally of the wagon. Intermediate the shank portion of the kingbolt that passes through the ring 6 and the head 8 is a broad annular shoulder 9, as clearly shown in Fig. 2, which shoulder constitutes one of the elements of the fifth wheel, while the ring 6 constitutes the other element. This arrangement forms a rigid and substantial structure for supporting the front end of the body and permits at the same time the axle to freely oscillate in a horizontal plane.

The lower portion of the head 8 of the kingbolt is provided with a plurality of spaced apertured projections or eyes 10, the apertures thereof alining in a direction extending longitudinally of the vehicle. The eyes 10 are designed to receive a horizontally extending pintle 11 that is disposed at a medial point of the axle and over the same. This pintle, by means of which the axle is free to oscillate in a vertical plane, is mounted on the axle by a frame to which the draft device of the vehicle is attached. This frame comprises two yokes 12, one at each end of the axle, a pair of upper transversely extending brace rods suitably connected with the yokes, and a pair of lower brace rods that are connected to the ends of the plates 13 of the yokes. Each pair of rods 14 and 15 are arranged so as to lie on opposite sides of the axle. The pintle 11 is supported on the plates 13 of the yokes by arched members 16 disposed on opposite sides of the axle. The ends of the plates 13 are formed into bearings and the arched members 16 are turned into eyes 17 to engage the plates 13. The pintle is secured to the arched member in any desired manner, as, for instance, by straps 18 riveted to the said members. The members 16 also form a part of the pintle supporting frame and contribute to greatly strengthen the same. The front end of the pintle 11 is rigidly secured to a cross bar 19 to which the draft device 20, which may be of any suitable character, is attached. Extending from the rear end of the pintle, and rigidly secured thereto, is a brace member 21 that extends under the axle in a forward direction and at its front end is rigidly secured to the cross bar 19. The outer ends of the cross bar 19 are held in fixed relation to the axle by links 22 connected at their ends with the axle and cross bar to serve as hounds. Interposed between the yokes 12 and the top side of the axle are helical compression springs 23 which yieldingly support the said frame on the axle to constitute a spring suspension for the front end of the vehicle body.

From the foregoing description, taken in connection with the accompanying drawing, the advantages of the construction will be readily understood by those skilled in the art to which the invention appertains. It will be obvious that with a vehicle equipped with the present invention, the vehicle can be turned on a very short radius and travel over undulations and roughnesses without subjecting the wagon as a whole to destructive strains or materially affecting the easy running of the wagon.

I have described the principle of operation of the invention, together with the apparatus which I now consider to be the best embodiment thereof, but I desire to have it understood that the apparatus shown is merely illustrative, and that various changes may be made, when desired, as are within the scope of the invention.

What is claimed is:—

1. The combination of a vehicle body, an axle, a king-bolt provided with a relatively broad annular shoulder, a socketed member on the under side of the body bottom for receiving the upper end of the king-bolt, an annular member suspended rigidly on the body for coöperating with the said shoulder to constitute a fifth wheel, and braces between the body and annular member.

2. The combination of a vehicle body, an axle, a king-bolt, a hinged connection between the king-bolt and axle which includes a frame extending forwardly of the axle, and a draft device attached to the frame at the front thereof.

3. The combination of a vehicle body, an axle, a king-bolt provided with a plurality of spaced eyes, a pintle engaging the eyes, a frame for holding the pintle on the axle and including members engaging between the eyes, a cross bar connected at the front side of the frame, and a draft device attached to the cross bar.

4. The combination of a vehicle body, a king-bolt provided with eyes, a pintle extending through the eyes, means for securing the pintle in fixed position, a cross bar connected with one end of the pintle, and a draft device attached to the cross bar, an axle, and hounds between the axle and cross bar.

5. The combination of a kingbolt, an axle below the same, yokes at the opposite ends of the axle, parallel rods connected with the yokes, arched members arranged on opposite sides of the axle and connected with the yokes, and a hinged connection between said members and the king-bolt.

6. The combination of a king-bolt, an axle below the same, yokes at the ends of the axle, springs between the yokes and axle, arched members extending parallel with the axle and connected at their ends with the yokes, bracing devices between the yokes, a pintle mounted on the arched members, and means on the king-bolt engaging the pintle.

In testimony that I claim the foregoing as my own, I have hereto affixed my signature in the presence of two witnesses.

WARREN G. HUGHES.

Witnesses:
JOHN C. CROWEN,
EDNA DWYER.